June 5, 1923.
E. P. SOMMERS
STARTER FOR INTERNAL COMBUSTION ENGINES
Filed June 21, 1920
1,457,946
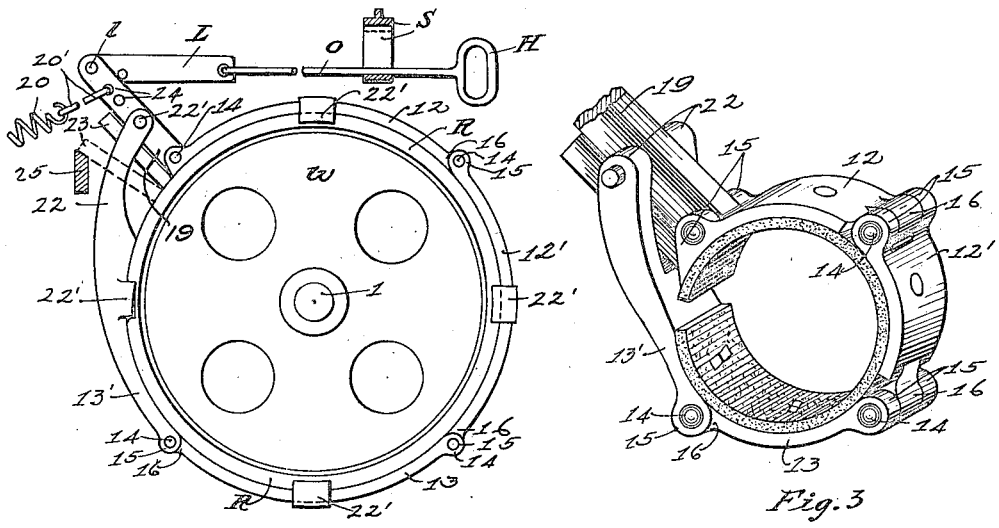
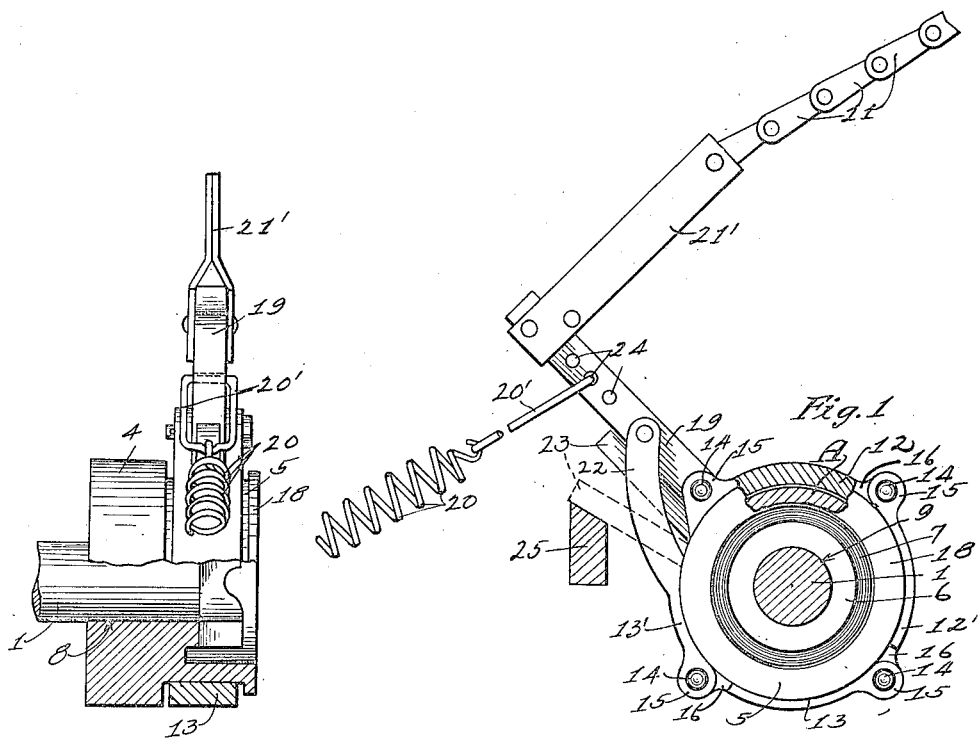
Inventor,
Edward P. Sommers, Patented June 5, 1923.

1,457,946

UNITED STATES PATENT OFFICE.

EDWARD P. SOMMERS, OF LOS ANGELES, CALIFORNIA.

STARTER FOR INTERNAL-COMBUSTION ENGINES.

Application filed June 21, 1920. Serial No. 393,449.

*To all whom it may concern:*

Be it known that I, EDWARD P. SOMMERS, a citizen of the United States, and a resident of Los Angeles, in the county of Los Angeles and State of California, have invented new and useful Improvements in Starters for Internal-Combustion Engines, of which the following is a specification.

My invention relates to means capable of being applied to internal combustion engines of the type used for propelling automobiles, or stationary engines, and is especially adapted for use on tractors and is adapted to be manually operated by means of hand or foot effort, the main objects of my invention being to provide a simplified form of starting device, means whereby said device may be readily attached to common types of pleasure, industrial and commercial vehicles, without altering the same, which in the case of small vehicles may be provided at a small cost, and which will be economical in operation and maintenance.

A further object is to provide a starting device especially adapted for use on light pleasure vehicles and is capable of modification for heavy duty on tractors, trucks and the like, said device embodying friction means applicable to the crank shaft or fly wheel of the engine which, when operated by the hand or foot effort, may turn the crank shaft at least a quarter of a revolution at each operation and thus start the engine.

A further object is to provide a combined pulley for operating the fan belt usually provided on pleasure automobiles, a clutch for connecting with the hand operated crank also usually provided therefor, and a friction wheel integrally formed and attached to the outer end of the crank shaft, a friction band of the character generally used with friction brakes being provided for the friction wheel, and means being provided for the friction wheel, and means being provided for holding the wheel and band in alinement at all times.

A further object is to provide an integral driving and friction element on the outer end of the crank shaft and a friction band therearound composed of a plurality of hinged segments, the joints therebetween being suitably spaced from the cam for contracting the band, thus rendering the action of the band more uniform than otherwise, and providing a more equal distribution of the friction exerted upon the wheel.

A still further object is to provide in such a starting mechanism, means for tightening the band around the friction wheel, means for restoring the parts to normal positions after each operation, and means whereby when a back-fire occurs during the starting operation, the friction band may be automatically released from the wheel. Other objects may appear in the hereinafter following detailed description.

I have shown a preferred embodiment of my invention in the accompanying drawing forming a part of this application, in which similar characters of reference are employed for indicating the same or like parts throughout the several views, and in which reference is had to Letters Patent No. 1,307,326, granted to me on June 17, 1919, for a somewhat similar device.

Figure 1 is a front elevation of my improved device, partly in section without the usual friction band.

Fig. 2 is a side elevation of the same.

Fig. 3 is a perspective view of the device with a friction element and operating means therefor.

Fig. 4 is a side elevation of a modified form of device applied to the engine fly wheel of a tractor or truck.

In the drawings, 1 represents the crank shaft of an internal combustion engine and A is an integrally formed rotatable element comprising a pulley 4, a friction wheel 5, and a spiral clutch member 6, the friction wheel 5 being provided with a recess 7, in which the clutch member 6 is formed. The pulley 4 is bored at 8, to receive and is adapted to be suitably keyed or otherwise secured to the crank shaft 1 of the engine, and the friction wheel 5 has a bore 9, to receive the inner end of a starting crank (not shown), the bores 8 and 9 being concentrically formed. It will be apparent that in such a structure, the pulley 4 will rotate with the crank shaft 1, and motion may thus be communicated from the crank shaft to a fan, (not shown).

A friction band composed of a plurality of metallic links 12, 12', 13 and 13' hinged together at their ends by means of pins 14, 14, etc., extending through suitable lugs 15 and 16, is provided for attachment to the friction wheel 5, and each of said links is suitably attached to a composition band 17 of fire proof and non-burning qualities, such as is generally used in brake bands for automobiles. The friction band is held in position on the wheel 5 between pulley 4 and a flange 18, on wheel 5, a groove being thus formed in said wheel.

An operating member 19 is pivoted at its lower end to one end of link 12, and is substantially extended outwardly therefrom, a spring 20 being connected with its outer portion by means of a loop 20', and an operating chain 21 being also attached thereto, as shown, by means of an intermediate link 21'. Link 13' is hinged to link 13 at one end to and operating member 19 at the other end 22, which is bifurcated and is adapted to receive an extension 23 from link 12 in the opening between the furcations of end 21 and operating lever 19.

The lever 19 may be connected by means of the chain 21, or by other suitable means, at its outer end, with the forward portion of the automobile body at a point convenient to the driver, so that the band may be contracted from the interior of the car, and the spring 20 may be attached to said lever in one or the other of a plurality of perforations 24, formed therein for restoring and expanding the band after each operation, the lower end of spring 20, being adapted to be connected to a suitable portion of the running gear frame of the vehicle.

In order to prevent damage to the starting mechanism when a back-fire occurs in the starting operation, I provide the extension arm 23 integral with link 12, and in the absence of a convenient engine frame member, a bar 25 may be provided, as shown in Fig. 1, for engagement with arm 23 when a back-fire occurs in the starting of the engine. It will be understood that in the event of a back-fire from the engine during the starting operation, when the lever 19 is raised, the crank shaft 1 will rotate in an anti-clockwise direction, carrying the friction band with it until the extended portion of the arm 23 engages the edge of member 25, whereupon the band will be caused to expand and damage to the parts will thus be prevented. The clockwise movement of lever 19, will contract the friction band and carrying links, 12, 12', 13 and 13' and rotate the wheel 5, thus imparting initial motion to the engine.

In the general use and adaptation of friction bands as used for brakes on vehicles, a single continuous band is provided and the tension of the band must be overcome before the same may be contracted to a sufficient extent as to serve their purpose, but in my band as shown and described, by means of the hinge joints, it will be apparent that the operation of the lever 19 will tightly clamp the links against the wheel 5, with but little effort on the part of the operator and the band may thus be made to normally clear the periphery of the wheel 5.

Referring now particularly to Fig. 4, it will be noted that my improvements are well adapted for use in connection with the engine fly wheel of a tractor or truck, or like vehicle, in which the fly wheel is usually of relatively large diameter and is very difficult to turn by manual effort for the purpose of starting the engine of such vehicles.

My device may be readily applied to the rim R of such a fly wheel W, the links 12, 12', 13 and 13' being substantially enlarged to correspond to the size of the wheel and increased in number as each case may require for effective operation. In this case an operating member O of any suitable form may be provided for moving the wheel W, but I have shown a horizontally movable member having a hand grip H on the outer end thereof and adapted to extend outwardly from the side of the tractor or truck so as to be easily accessible to the hand of an operator who may stand on the ground at the side of the vehicle and pull the handle outwardly for turning the wheel through the connections L and 19, which are pivoted together at 1. Member O may have a guide member S attached to a suitable portion of the tractor or truck frame for operably supporting the same at a proper elevation. The links 12, 12', 13 and 13' may have lugs 22' overlying the edges of the wheel rim R so as to retain the starting band in position on said wheel, and the friction band shown in Fig. 3 may or may not be used, as occasion requires.

What I claim is:

1. A starter for engines comprising a friction band having a plurality of hingedly connected segments, a rotatable member common to said segment, two adjacent sections thereof having spaced extensions, a common operating member therefor pivoted to the extension on one of said members and to the adjacent member at a point spaced therefrom, and means for engagement with said other extension, for expanding said members relative to said rotatable member, when a back-fire occurs in the operation of the engine.

2. A starter for engines comprising a friction band having a plurality of hinged segments provided with friction surfaces on their inner sides, two adjacent segments having extensions thereon, a rotatable member therewithin, an operating member common to and separately pivoted to said adjacent segments at spaced points, a spring for normally holding said segments expanded relative to said rotatable member, means for contracting said segments against the tension of said spring, and an arm attached to one of said segments and adapted for operation when a reverse motion of the engine is caused, for expanding said band.

3. A starter for engines comprising a friction band having a plurality of hingedly connected segments, a rotatable member common to said segments, two adjacent sections thereof having spaced extensions, a common operating member therefor pivoted to the extension on one of said members and to the adjacent member at a point spaced therefrom, and a spring connected with said operating member and fixed at its other end for holding said segments normally expanded out of engagement with said rotatable member.

4. A starter for engines comprising a friction band having a plurality of hingedly connected segments, a rotatable member common to said segments, two adjacent sections thereof having spaced extensions, a common operating member therefor pivoted to the extension on one of said members, and to the extension on the adjacent member at a point on a substantially radial line from the axis of said rotatable member, and means for engagement with said other extension for expanding said segment for disengagement with said rotatable member when a back-fire occurs in the engine.

5. A starter for internal combustion engines comprising a plurality of segments hingedly connected together and having a friction band on the inner surfaces thereof, a rotatable member mounted within said segments, one of said segments having lugs formed thereon, an operating member pivotally attached to said lugs and extended outwardly therefrom at a substantially radial plane from the axis of said rotatable member, the adjacent segment having an elongated extension thereon pivotally connected to said operating member at a point outwardly of the lug on said other segment, whereby the movement of said operating member will serve to expand and contract all of said segments relative to said rotatable member 6. A starter for internal combustion engines comprising a plurality of segments hingedly connected together and having a friction band on the inner surfaces thereof, a rotatable member mounted within said segments, one of said segments having lugs formed thereon, an operating member pivotally attached to said lugs and extended outwardly therefrom at a substantially radial plane from the axis of said rotatable member, the adjacent segment having an elongated extension thereon pivotally connected to said operating member at a point outwardly of the lug on said other segment, whereby the movement of said operating member will serve to expand and contract all of said segments relative to said rotatable member, and a spring connected with said operating member for holding said segments normally expanded 7. A starter for internal combustion engines comprising a plurality of segments hingedly connected together and having a friction band on the inner surfaces thereof, a rotatable member mounted within said segments, one of said segments having lugs formed thereon, an operating member pivotally attached to said lugs and extended outwardly therefrom at a substantially radial plane from the axis of said rotatable member, the adjacent segment having an elongated extension thereon pivotally connected to said operating member at a point outwardly of the lug on said other segment, whereby the movement of said operating member will serve to expand and contract all of said segments relative to said rotatable member, a spring connected with said operating member for holding said segments normally expanded, and an arm attached to one of said segments and adapted for operation when a reverse motion of the engine is caused for automatically expanding said segments.

EDWARD P. SOMMERS.

Witnesses:
   LUTHER L. MACK,
   E. M. DESSIEUX.